Dec. 13, 1960 EARL YIM, JR 2,963,740
MANDREL FOR EXTRUSION COATING PROPELLANT GRAINS
Filed May 6, 1958
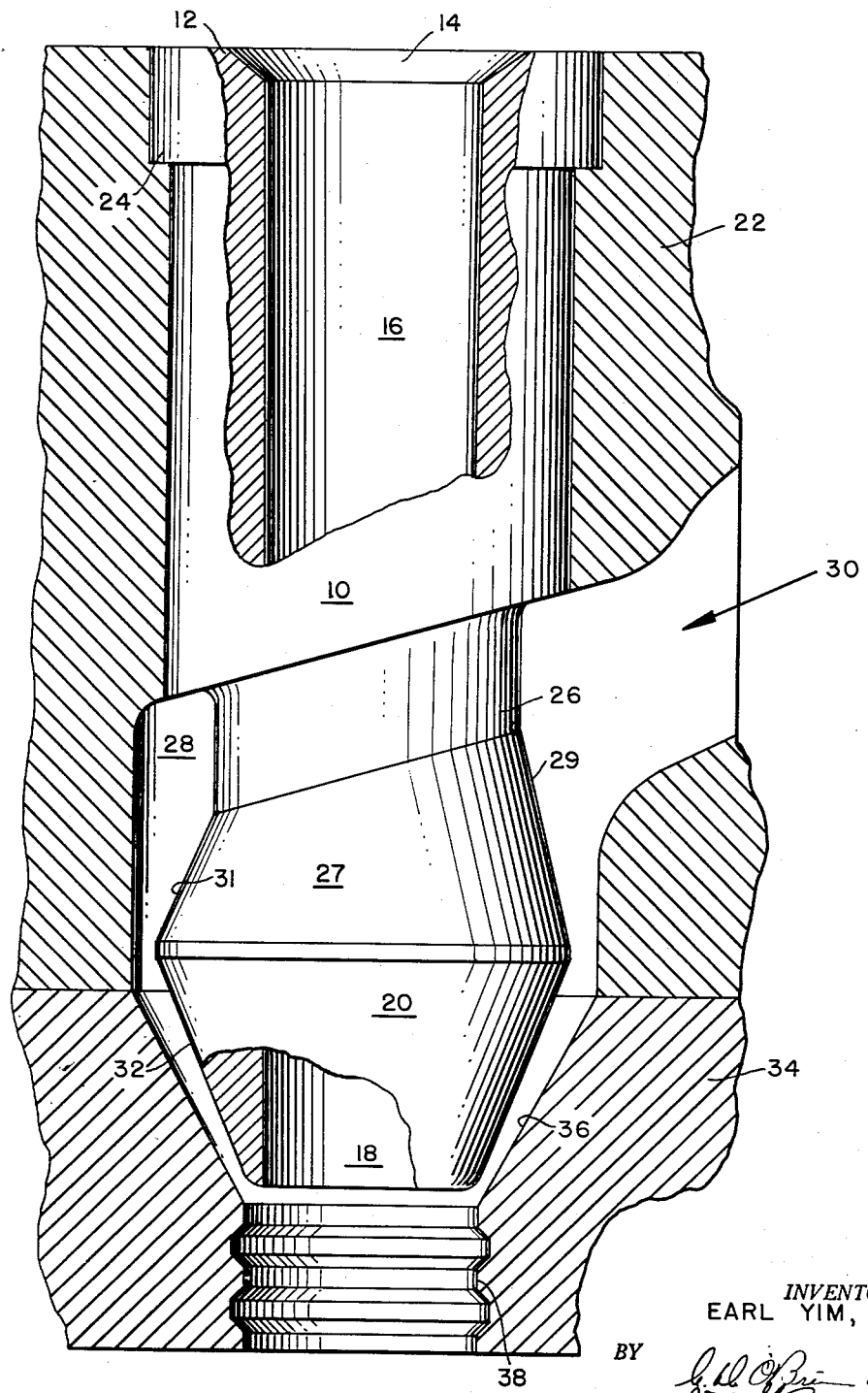
INVENTOR.
EARL YIM, JR.
BY
ATTORNEYS 2,963,740
Patented Dec. 13, 1960

2,963,740

MANDREL FOR EXTRUSION COATING PROPELLANT GRAINS

Earl Yim, Jr., China Lake, Calif., assignor to the United States of America as represented by the Secretary of the Navy Filed May 6, 1958, Ser. No. 733,455

3 Claims. (Cl. 18—13)

(Granted under Title 35, U.S. Code (1952), sec. 266)

The invention described herein may be manufactured and used by or for the Government of the United States of America for governmental purposes without the payment of any royalties thereon or therefor.

The present invention relates to apparatus for extrusion coating continuous material and particularly to a mandrel which is adapted to coat propellant grains which are passed through it with a concentric and constant plastic material over tapering diameter or constant diameter grain.

Prior equipment for extrusion coating tapered propellant grain was entirely inadequate in that one or more of the following would occur: the plastic coating would not be concentric with the outside diameter of the grain; the plastic coating would have large waves over the tapered portion of the grain; there would be an absence of plastic coating on the tapered portion of the grain due to plastic starvation; or, the texture of the plastic coat would be rough over the tapered portion of the grain.

The present invention is an improvement over and overcomes the disadvantages of prior apparatus in that an annular chamber is included in the mandrel to act as a reservoir for the coating material so as to insure that more coating material will be available. The coating material, which is plastic, is forced around the hollow mandrel so that the grains passing through it receive a coating of plastic through contact.

It is an object of the present invention to provide an improved mandrel for extrusion coating propellant grains.

Another object of the invention is to provide a mandrel which will produce a concentric plastic coating of substantially constant diameter over tapered propellant grain.

A further object of the invention is to provide a mandrel which will provide substantially smooth and constant coating of plastic over the surface of tapering diameter propellant grain.

Other objects and many of the attendant advantages of this invention will be readily appreciated as the same become better understood by reference to the following detailed description when considered in connection with the accompanying drawing wherein:

The figure is a vertical, partly sectional, view of the mandrel of the present invention.

Referring now to the figure of drawing, the mandrel comprises a body portion 10, of steel or other suitable material, having an entrance end 12 and having a chamfered opening 14 into tubular passage 16 through which material for forming propellant grain is forced. After passing through tubular passage 16 the propellant grain material will exit through opening 18 in the lower end 20 of the mandrel.

Mandrel 10 is shown positioned in the crosshead 22 of the apparatus for making coated propellant grains. Crosshead 22 is shown only in a breakaway section since a complete showing of the apparatus is not necessary for illustrating the invention. Flange 24 on the upper end of mandrel 10 supports the mandrel in crosshead 22. Mandrel 10 when positioned as shown in the figure has a narrow portion 26 and beveled portion 27 which forms a cavity or reservoir 28 within crosshead 22 for plastic material which is used to coat the propellant gains. Plastic material in a fluid state enters reservoir 28 through passage 30 in the crosshead. It is to be noted that beveled portion 27 has a long side 29 facing passage 30 and a short side 31 oppositely disposed from passage 30. Upon flow of the plastic coating material there is a pressure drop across narrow portion 26. If not compensated for, this pressure drop would result in an uneven flow rate around the periphery of lower end 20 of the mandrel. The present invention compensates for this pressure drop by positioning short side 31 in direct communication with the low pressure region thus providing less viscous drag upon the plastic coating material than long side 29 which is in direct communication with the higher pressure region. Thus by decreasing the viscous drag with decreasing pressure there is a resultant constant flow rate around the entire periphery of lower end 20 of the mandrel.

The lower end 20 of the mandrel is beveled at 32; a crosshead die 34 having an opening 36 therethrough similar to but slightly larger than the beveled portion 32 of the mandrel is attached to crosshead 22 and fits about the lower beveled end of the mandrel. The space between the surfaces of bevel 32 of lower end 20 of the mandrel and opening 36 of crosshead die 34 form a passage through which a concentric coating of plastic material is extruded about the propellant grain as it is extruded from opening 18. In crosshead die 34 are a plurality of raised annular ring portions 38 on the inner surface thereof for maintaining a smooth coating of constant diameter on the surface of the extruded article. The plastic material flows through passage 30 filling reservoir 28, passes over beveled portion 27 and is extruded out through the passage between the beveled surface 32 of the mandrel and interior surface of opening 36. This provides a substantially smooth, uniform, concentric and constant diameter coating of plastic about the propellant grain as the propellant material and plastic coating material are extruded simultaneously.

The improved mandrel 10 provides a reservoir of pressurized excess plastic material, providing plastic for coating as needed for tapered as well as for constant diameter propellant grain. This improved mandrel 10 together with the crosshead die 34, as shown in the figure, allows a constant diameter coating of plastic inhibition to be provided on tapered diameter propellant grain.

Obviously, many modifications and variations of the present invention are possible in the light of the above teachings. It is therefore to be understood that within the scope of the appended claims the invention may be practiced otherwise than as specifically described.

What is claimed is:

1. An apparatus for extrusion coating a longitudinally extended article having a tapering cross-section comprising a crosshead having a cavity and an inlet conduit communicating therewith for conveying a fluid coating material, a die having on a frusto-conical cavity, said crosshead and die fixed together with the cavities in communication, a mandrel having an opening therein for receiving said article, the exterior surface of said mandrel including a right angle frusto-conical surface and a non-right angle frusto-conical surface, said right angle frusto-conical surface having large and small ends and the cross-section of the large end defining a large circle, said non-right angle frusto-conical surface having large and small ends and the cross-section of the large end defining a large circle, the large circles of said frusto-conical surfaces being interconnected and axially aligned, a cylinder of smaller diameter than said large circles being axially aligned therewith and connected to the small end of said non-right angle frusto-conical surface thereby forming a non-right angle frusto-conical surface having a long side and an oppositely disposed short side, said mandrel being disposed in said cavities with the right angle frusto-conical surface concentrically disposed in said die cavity and said non-right angle frusto-conical surface and small cylinder disposed in said crosshead cavity having the long side of said non-right angle frusto-conical surface facing said inlet conduit and the short side opposite therefrom, whereby fluid flow through said device results in a pressure drop across said cylinder of smaller diameter which pressure drop is compensated for by the short side of said cone providing less viscous drag than the long side thereby providing a constant flow rate through the entire annulus formed between the large diameter of the cones and the cavities and whereby the reservoirs formed between the cone and small cylinder and the crosshead cavity provide sufficient fluid to obtain a coating of constant diameter throughout the entire length of said article having a tapering cross-section.

2. An apparatus for extrusion coating a longitudinally extended article comprising an extrusion cross-head having first and second walls defining a cavity, said first wall being a cylinder of constant diameter and a first part of said second wall being at an angle acute to the longitudinal axis of said crosshead, a conduit communicating with the cavity adjacent and parallel to said second wall for supplying a fluid coating material, a die having a frusto-conical cavity the larger diameter thereof being the same as said constant diameter and fixedly positioned contiguous therewith, a longitudinally extended mandrel having front and rear ends and an opening therein for receiving said article, said mandrel concentrically disposed within said crosshead and die cavities, the exterior surface of said mandrel having a first frusto-conical surface the small diameter being at the front end of said mandrel and adjacent the small diameter of said frusto-conical die cavity and the large diameter being adjacent to and less than said constant diameter cylinder, said exterior surface also including a plane surface in alignment with said first part of said second wall and a cylindrical surface having a diameter less than the large diameter of said first conical surface and extending frontwardly from said mandrel plane surface to a plane parallel to said second wall and a conical surface adjacent to and extending from said large diameter of said mandrel to said mandrel cylindrical surface, thereby forming a non-right angle frusto-conical surface with the long side thereof facing said conduit and the short side opposite therefrom.

3. An apparatus for extrusion coating a longitudinally extended article having a tapering cross-section comprising an extrusion crosshead having a cavity, one wall of said cavity being cylindrical and of constant diameter, a conduit communicating with one side of said cavity, a die having a frusto-conical cavity the larger diameter thereof being the same as said constant diameter and fixedly positioned contiguous therewith, a longitudinally extended mandrel having an opening therein for receiving said article, the exterior surface of said mandrel including a collar forming another wall of said crosshead cavity, a small cylinder extending from said collar and into said crosshead cavity, a non-right angle frusto-conical surface the small end thereof intersecting said small cylinder at an obtuse angle and the large diameter axially aligned with said small cylinder and in said crosshead cavity, the large diameter of said non-right angle frusto-conical surface being less than said constant diameter and the longest surface of said non-right angle frusto-conical surface being adjacent said conduit and the shortest surface being opposite therefrom, a right-angle frusto-conical surface the large diameter being the same as and adjacent the large diameter of said non-right angle frusto-conical surface and being disposed in said die cavity.

References Cited in the file of this patent

UNITED STATES PATENTS

| 2,687,553 | Colombo | Aug. 31, 1954 |
| 2,758,337 | Kivley | Aug. 14, 1956 |
| 2,794,213 | Davis | June 4, 1957 |

FOREIGN PATENTS

| 1,123,641 | France | June 18, 1956 |
| 915,933 | Germany | Aug. 2, 1954 |